(12) United States Patent
Lakshmanan et al.

(10) Patent No.: US 9,732,398 B2
(45) Date of Patent: Aug. 15, 2017

(54) CHLORIDE PROCESS FOR THE LEACHING OF GOLD

(71) Applicant: Process Research Ortech Inc., Missisuaga (CA)

(72) Inventors: Vaikuntam I. Lakshmanan, Mississauga (CA); Ramamritham Sridhar, Oakville (CA); M. A. Halim, Mississauga (CA)

(73) Assignee: Process Research Ortech Inc. (CA)

( * ) Notice: Subject to any disclaimer, the term of this patent is extended or adjusted under 35 U.S.C. 154(b) by 1042 days.

(21) Appl. No.: 13/858,147

(22) Filed: Apr. 8, 2013

(65) Prior Publication Data

US 2013/0283976 A1    Oct. 31, 2013

Related U.S. Application Data

(60) Provisional application No. 61/621,617, filed on Apr. 9, 2012.

(51) Int. Cl.
*C22B 3/00* (2006.01)
*C22B 3/10* (2006.01)

(52) U.S. Cl.
CPC ............... *C22B 11/04* (2013.01); *C22B 3/10* (2013.01); *Y02P 10/234* (2015.11)

(58) Field of Classification Search
CPC . C22B 11/00; C22B 11/04; C22B 3/10; Y02P 10/234
USPC .......................................... 75/711, 741, 744
See application file for complete search history.

(56) References Cited

U.S. PATENT DOCUMENTS

| | | | |
|---|---|---|---|
| 4,244,735 A | | 1/1981 | Reynolds et al. |
| 4,551,213 A | | 11/1985 | Wilson |
| 4,913,730 A | * | 4/1990 | Deschenes ............. C01G 7/003 423/22 |
| 7,547,348 B2 | | 6/2009 | Hultholm et al. |
| 7,736,606 B2 | | 6/2010 | Harris et al. |
| 7,776,135 B2 | | 8/2010 | Hamalainen et al. |
| 7,785,395 B2 | | 8/2010 | Leppinen et al. |
| 7,799,114 B2 | | 9/2010 | Haavanlammi et al. |
| 7,803,336 B2 | | 9/2010 | Lakshmanan et al. |
| 2002/0034465 A1 | * | 3/2002 | Marsden ................ C01G 3/003 423/27 |
| 2005/0066774 A1 | | 3/2005 | Asano et al. |
| 2005/0118081 A1 | * | 6/2005 | Harris ...................... C22B 3/10 423/22 |
| 2010/0296987 A1 | | 11/2010 | Hyvarinen et al. |

FOREIGN PATENT DOCUMENTS

| | | |
|---|---|---|
| EP | 0113454 | 7/1984 |
| WO | WO2006013568 | 2/2006 |
| WO | WO2011015686 | 12/2011 |

OTHER PUBLICATIONS

Lu P., J. Chem. Technol. Biotechnol., vol. 83, Iss. 10, Oct. 2008, pp. 1428-1432.
Aylmore M.G., World Gold Conference 2011, Oct. 2-5, 2011, part of the Conference of Metallurgists, 41st Hydrometallurgy Meeting in Montreal.

* cited by examiner

*Primary Examiner* — Jessee Roe
*Assistant Examiner* — Jenny Wu
(74) *Attorney, Agent, or Firm* — Tarolli, Sundheim, Covell & Tummino LLP

(57) ABSTRACT

A process for the extraction of gold from a gold-bearing ore or concentrate, comprising the steps of leaching the gold-bearing ore or concentrate with a lixiviant of hydrochloric acid and magnesium chloride at atmospheric pressure at a temperature of at least 90° C. and an Eh of at least 900 mV. After a liquid/solids separation step, the solution obtained is subjected to an organic solvent extraction step using an oxime to obtain a solution of organic solvent containing gold, which is stripped with sodium thiosulphate to recover gold. The extraction may be operated to extract gold with or without iron. Materials used in the process may be recycled. The process avoids environmental and other hazards associated with the use of cyanide to extract gold.

9 Claims, No Drawings

CHLORIDE PROCESS FOR THE LEACHING OF GOLD

REFERENCE TO RELATION APPLICATION

This application claims priority under 35 USC 119(e) from U.S. Provisional Patent Application No. 61/621,617 filed Apr. 9, 2012.

FIELD OF THE INVENTION

The present invention relates to the leaching and recovery of gold from gold-bearing ores or concentrates using a mixed chloride lixiviant. In particular, the invention relates to a process for the leaching of gold from a gold-bearing ore or concentrate with a lixiviant comprising hydrochloric acid and magnesium chloride. In embodiments, the invention relates to a process for the leaching and recovery of gold from a gold-bearing ore or concentrate with a lixiviant comprising hydrochloric acid and magnesium chloride, followed by solvent extraction of gold from the leachate liquid, stripping with sodium thiosulphate and precipitation to recover gold. An important aspect of the invention is stripping of gold from solution using sodium thiosulphate. The process may be operated so that, in the extraction step, gold may be selectively extracted or co-extracted with iron. In a particularly important aspect, the present invention provides for the separation of gold from iron in a process for the extraction of gold from gold-bearing ores or concentrates in which gold is extracted before iron is extracted. Lixiviant, extractant and other materials used in the process may be recovered and recycled. The process for the leaching and recovery of gold does not involve use of cyanidation steps, and thus avoids environmental and other hazards associated with use of cyanide. As exemplified, very high levels of extraction and recovery of gold may be achieved.

BACKGROUND TO THE INVENTION

In the gold mining industry, gold-bearing ore is mined and then subjected to steps to recover the gold. The gold may be present in the ore on a microscopic scale and/or steps may be taken to grind or otherwise comminute the ore so that the gold is in a form suitable for extraction. Concentrate may be used. Methods for the recovery of gold from ore or especially concentrate include use of pyrometallurgical processes. Alternatively, concentrate may be subjected to cyanide leaching, by contacting the gold ore concentrate with solutions of cyanide and oxidant in alkaline solution; acidic solutions of cyanide result in the formation of hydrogen cyanide which is extremely hazardous and thus acidic treatment of waste solids obtained after cyanide leaching is also to be avoided. Notwithstanding any recycling or other steps in the process, a consequence of such a process is that large volumes of toxic solids and liquids are produced, which must be disposed of in an environmentally-acceptable manner.

One method of recovery of gold from solution after cyanide leaching is use of activated carbon. A variety of methods may be used, as discussed in US patent application 2010/0296987 A1 of O. Hyvarinen et al, published 25 Nov. 2010. For example, gold is precipitated from solution onto carbon using a chloride-based solution, for example using a solution of $Cu^{++}$ chloride and sodium chloride. Subsequently, the gold may be redissolved using cyanide and recovered by precipitation with zinc or by electrolysis.

U.S. Pat. No. 7,547,348 of S-E. Hultholm et al, issued 16 Jun. 2009, exemplifies the leaching of copper and nickel from a sulphidic composition containing Cu, Ni, Fe, S, Pd and 14 ppm of gold at a temperature of 90° C. and a redox potential of 500 mV with pure 25% hydrochloric acid; it is stated that PGMs start to dissolve at a higher redox potential. The resulting acidic leach solution, which contained copper and nickel in solution, was extracted with a known copper extractant, such as an oxime. Subsequently, the organic phase was washed with dilute sulphuric acid to remove iron and chloride residue. The copper-containing organic solution is then stripped. The leach residue from the process contains the PGMs and most of the sulphidic sulphur. The PGM concentrate that was ultimately obtained contained 2% gold and was stated to be suitable for sale or further refining.

U.S. Pat. No. 7,785,395 of J. Leppinen et al, issued 31 Aug. 2010, discloses leaching with $Cu^{++}$ chloride and alkali metal chloride to effect dissolution of copper and some gold. After further processing, gold is recovered using activated carbon or by ion exchange. U.S. Pat. No. 7,799,114 of L. Haavanlammi et al, issued 21 Sep. 2010, discloses that gold contained in waste or intermediate fractions is leached by means of $copper^{++}$ chloride, oxygen and alkali bromide under conditions in which the oxidation potential is a maximum of 650 mV and the pH a minimum of 0.5. The bromide is stated to accelerate the dissolution of gold. U.S. Pat. No. 7,776,135 of M. Hamalainen et al, issued 17 Aug. 2010 also discloses a process in which copper and gold are leached using a solution of $copper^{++}$ chloride, sodium chloride and oxygen.

Alternative lixiviants to cyanide, including halide lixiviants, are discussed in a paper presented by M. G. Aylmore at the World Gold Conference 2011, 2-5 Oct. 2011, part of the Conference of Metallurgists, $41^{st}$ Hydrometallurgy Meeting in Montreal. Halide leaching of gold using chlorine, bromine and iodine of gold was discussed. Alternative process use 5M hydrochloric acid under oxidizing conditions with chlorine or a chloride electrolyte (NaCl and NaBr with added chlorine/bromine complex ($BrCl_2^-$)). Leaching in regenerated hydrochloric acid is also known although details are stated to be vague. Several other oxidants e.g. oxygen or nitric acid dissolve gold in the presence of chloride; ferric chloride may also be used with chloride. It is stated that most of these alternative processes are restricted to high-grade concentrates and have been used as a pre-treatment process for leaching gold with cyanide. Lack of a suitable recovery process to match that from cyanide extraction has been the main limitation of the use of chloride processes. Thiosulphate has been used in the leaching of gold, especially on copper-gold and carbonaceous ores that give poor gold recoveries using cyanide. It is also know to use thiourea, thiosulphate and cyanide in elution of gold absorbed onto activated carbon or resin-packed fixed columns.

In other mining industries, processes have been developed to extract value metals e.g. nickel and titanium, with recycling of solutions used in the process and with substantially reduced environmental issues. One example is the use of solutions of hydrochloric acid and magnesium chloride in the extraction of titanium from titanium-bearing ores or concentrates at low temperatures, as disclosed in U.S. Pat. No. 7,803,336 of V.I. Lakshmanan, R. Sridhar et al, issued 28 Sep. 2010. U.S. Pat. No. 7,736,606 of V.I. Lakshmanan, R. Sridhar et al, issued 15 Jun. 2010, describes extraction of base metal sulphide ores with a lixiviant of a chloride, an oxidant and hydrochloric acid.

Processes that are effective for the recovery of gold from gold-bearing ores or concentrates and which have low or minimal environmental issues would be beneficial. Such processes should include potential for recycling of components used in the process so as to reduce environmental issues and for economic operation of the process. In addition, processes should be capable of separating gold from other value metals in leaching steps. There is a particular need for such processes in the gold mining industry.

SUMMARY OF THE INVENTION

An aspect of the present invention provides a process for the leaching of gold from gold-bearing ores or concentrates that does not involve the use of cyanide. In another aspect, the present invention provides a process for the leaching and recovery of gold from gold-bearing ore or concentrate in which solutions used in various stages of the process may be recycled.

Another aspect of the present invention provides for the separation of iron and gold in a process for the leaching of gold from a gold-bearing ore or concentrate. In particular, gold may be selectively extracted away from iron in solution.

A further aspect of the invention provides for separation of gold from a pregnant gold-bearing organic solvent extractant solution using sodium thiosulphate.

Thus, in one aspect, the present invention provides a process for the extraction of gold from a gold-bearing ore or concentrate, comprising the steps of:
  a) leaching the gold-bearing ore or concentrate with a lixiviant of hydrochloric acid and magnesium chloride at atmospheric pressure at a temperature of at least 90° C. and an Eh of at least 900 mV; and
  b) subjecting the leach solution so obtained to a liquid/solids separation step.

In a preferred embodiment of the process, liquid from step b) is subjected to steps for recovery of gold. In particular, the liquid is subjected to organic solvent extraction followed by steps to recover gold from the resultant pregnant gold-bearing organic solvent extractant solution.

In another embodiment of the process, the temperature is in the range of 90-100° C. and the Eh is in the range of 1050-1150 mV.

In another aspect, the present invention provides a process for the extraction of gold from a gold-bearing ore or concentrate, comprising the steps of:
  a) leaching the gold-bearing ore or concentrate with a lixiviant of hydrochloric acid and magnesium chloride at atmospheric pressure at a temperature of at least 90° C. and an Eh of at least 900 mV;
  b) subjecting the solution obtained in step a) to a liquid/solids separation step;
  c) subjecting the liquid obtained in step b) to an organic solvent extraction step to obtain a pregnant gold-bearing organic solvent extractant solution;
  d) stripping gold from the pregnant organic solvent extractant solution obtained in step c) with sodium thiosulphate; and
  e) recovering gold.

In an embodiment, the solvent extraction of step c) is a selective extraction step to obtain gold, preferably using an oxime. Alternatively, the solvent extraction of step c) is a co-extraction step to obtain gold and another metal.

In an embodiment, in step d), gold is recovered by precipitation.

In a further embodiment, the oxime of step c) is 5-nonylsalicylaldoxime.

In another embodiment, subsequent to the stripping of step d), gold is precipitated from solution by addition of oxalic acid.

In yet another embodiment, raffinate from step c) is subjected to steps to remove iron, and magnesium chloride solution so obtained is recycled to step a).

In an embodiment, subsequent to the precipitation of gold, the solution obtained is subjected to a liquid/solids separation step and the liquid obtained is recycled to step a).

The present invention also provides a process for the stripping of gold from a pregnant gold-bearing organic solvent extractant solution, comprising the step of adding an aqueous solution of sodium thiosulphate to the pregnant gold-bearing organic solvent extractant solution. In particular, steps are taken to separate the resultant organic and aqueous solutions, the aqueous solution containing gold.

In an embodiment, the pregnant gold-containing organic solution is obtained from solvent extraction of an aqueous gold-bearing leach solution. In particular, the aqueous gold-bearing leach solution contains hydrochloric acid and magnesium chloride.

DETAILED DESCRIPTION OF THE INVENTION

The present invention relates to a process for leaching of gold from a gold-bearing ore or concentrate. The gold-bearing ore or concentrate is leached with a lixiviant of hydrochloric acid and magnesium chloride under conditions such that the gold is leached into solution. After a solids/liquids separation step, the gold may be extracted from the liquid in a solvent extraction step and recovered. In particular, the gold may be recovered by stripping an organic solution of gold with sodium thiosulphate. The hydrochloric acid and magnesium chloride of the lixiviant may be recovered and recycled to the leaching step.

The present invention particularly relates to a process for leaching of gold-bearing ores or concentrates. Such ores may contain iron. The process is operated at atmospheric pressure. While the concentration of hydrochloric acid may be varied, the preferred concentration of hydrochloric acid is not more than about 20% (mass ratio). Such a concentration of acid may be obtained by azeotropic distillation of hydrochloric acid solution, for example in recycle of hydrochloric acid solution in the process e.g. using pyrohydrolysis. As discussed herein, such a low concentration of hydrochloric acid provides advantages to the process, including in recycle steps in the process and in requirements for disposal of effluent.

The gold-bearing ore material may be ore per se, but is preferably a concentrate thereof. Techniques for treating gold-bearing ore to form a concentrate or for beneficiation of the ore are known. The ore may also be in the form of tailings from another process or a roasted or calcined ore or concentrate. Flotation processes may be used to obtain concentrates for the process of the present invention. It is understood that the expression "ore" also includes any other form of the ore, and that mixtures of the various forms of the ore may be used. In particular embodiments of the invention, the process is operated on tailings, waste or other material obtained from another process. The process may also be operated on refined or other products that are relatively high in gold content. In addition, the process may be operated on gold-bearing materials that also contain carbonaceous material. Other sources will be apparent to persons skilled in the art. The material fed to the process should be comminuted or ground to improve the contact between lixiviant and gold to be leached. All of these forms are regarded as ore or concentrate to be fed to the process. It is understood that some sources may not be appropriate for the acid conditions of the leach e.g. sources containing cyanide from a cyanidation leach, unless steps have been taken to reduce hazards to an acceptable level.

The process may be operated with or without roasting or reduction of the ore. However, in embodiments, the ore or concentrate may have been subjected to roasting or calcination.

In the method of the present invention, ore in a form as discussed above is fed to a leaching step in which the ore is contacted and leached with a lixiviant comprising magnesium chloride and hydrochloric acid, optionally also containing an oxidant. Regeneration and recycling of ingredients used in the leach and in subsequent extraction and recovery steps is an important aspect of the process, and use of other chlorides or mixtures of chlorides e.g. alkali metal chlorides, may adversely affect such recovery and recycling. Thus, the lixiviant is restricted to hydrochloric acid with magnesium chloride being the only added metal chloride, with oxidant to obtain the Eh (electric potential versus SHE (standard hydrogen electrode) levels discussed herein. Such oxidant is selected from the group consisting of alkali metal peroxide, alkali metal perchlorate, ammonium perchlorate, magnesium perchlorate, alkali metal chlorate, magnesium chlorate, alkali metal hypochlorite, chlorine, hydrogen peroxide and other non-sulphur containing oxidants, and mixtures thereof. Examples of alkali metal peroxide are sodium peroxide and potassium peroxide. Examples of alkali metal perchlorates are sodium perchlorate and potassium perchlorate. Ammonium perchlorate, magnesium perchlorate and magnesium chlorate may also be used. Examples of alkali metal chlorates are sodium chlorate and potassium chlorate. An example of an alkali metal hypochlorite is sodium hypochlorite. Other oxidants are non sulphur containing oxidants; the presence of sulphur in oxidants is to be avoided. The preferred oxidants are chlorine and sodium chlorate.

The gold-bearing ore is subjected to a leach with a lixiviant of hydrochloric acid and magnesium chloride. The leaching may be conducted as a co-current step, a counter-current step or in another manner, and is most conveniently carried out at atmospheric (ambient) pressure. It is not necessary to conduct the leaching step under pressure. According to the invention, the leach is carried out at a temperature in the range of from 90° C. up to the boiling point of the leaching solution, and especially at a temperature in the range of 90-100° C. In addition, the oxidation potential (Eh) should be at least 900 mV and especially in the range of 1050-1150 mV. The leaching step is preferably carried out with a magnesium chloride concentration of at least 150 g/L, for instance 150-400 mg/L and especially in the range of 200-250 g/L. The hydrochloric acid used in the lixiviant has a maximum concentration of 18% (mass ratio). In embodiments, the concentration of hydrochloric acid is at least 12% and especially in the range of 14-18% (mass ratio); for instance the hydrochloric acid may be 3.5-4.0N. The chloride concentration in the lixiviant is most preferably in the range of 100-400 g/L, and especially 200-300 g/L. The Mg/HCl (magnesium to hydrochloric acid) ratio expressed in terms of mass percentage (m/m) in the leach is preferably adjusted to optimize the leach, based on for example the particular ore or concentrate being leached and temperature. The Mg/HCl ratio in the lixiviant is generally in the range of 0.1-2.0, especially 0.4-1.0. The leach may be a single stage leach or a multi-stage leach. In addition, the leaching steps may be conducted co-current or countercurrent, in whole or in part.

Subsequent to the leach, the leaching solution is subjected to a liquid/solids separation step. The liquid is then subjected to steps to extract the gold from the leaching solution, especially using solvent extraction, as discussed below. The solids may be discarded or may be subjected to further steps to extract gold or other value metals that may be in the solids.

As noted above, the leaching solution from the gold leach is subjected to a liquid/solids separation step with solids being recycled for further leaching or discarded. The pregnant liquid from the gold leach is subjected to steps to recover gold. In particular, the liquid is treated to a solvent extraction step using an organic solvent to extract the gold into the extractant. In particular, the extractant of the solvent extraction step may be an oxime. An example of an oxime is LIX 622N i.e. 5-nonylsalicylaldoxime. Other extraction agents may be used, for example a crown ether, phosphinic acid, ester or oxide, or tertiary or quaternary ammonium salt. An example is Alamine™ 336 alkyl amine. The extractant is preferably mixed with a diluent and a modifier. Examples of the diluent are organic phase diluents, for instance kerosenes e.g. CF-231 kerosene. Examples of the modifier are alcohol surfactants e.g. EXXAL™ 13 tridecylalcohol.

The liquid subjected to solvent extraction may contain value metals other than gold, especially iron. In the leaching step with hydrochloric acid and magnesium chloride, iron will be leached into solution. The solvent extraction may be carried out such that relatively high or relatively low amounts iron are extracted into the organic solution of the solvent extraction. Thus, the pregnant gold-bearing organic solvent extractant solution may have a high iron content or a low iron content. The latter is preferred, as it facilitates the recovery of gold of higher purity. For instance, if the extractant is LIX 622N and the solvent extraction is carried out with LIX 622N, EXXAL™ 13 tridecyl alcohol and CF-231 kerosene in a ratio of Jan. 20, 1979 by volume, then gold is extracted in preference to iron. Alamine™ 336 alkyl amine gives co-extraction of iron and gold. Selective extraction of gold but not iron is preferred as it simplifies subsequent recovery of gold and allows for the use of smaller quantities of an extractant that selectively extracts gold than of an extractant needed for co-extraction of both gold and iron.

The liquid from the solvent extraction is separated into a loaded organic phase and an aqueous phase. The loaded organic phase is sent to a stripping step; the phase may be subjected to a scrubbing step prior to stripping, using selective or co-extraction techniques. The loaded organic phase may be stripped, in particular, with an aqueous solution of sodium thiosulphate, water or sulphuric acid. Sodium thiosulphate is preferred. The resultant aqueous phase, which contains gold, is subjected to a gold-precipitation step. Oxalic acid may be used to effect precipitation of gold. The gold-bearing solids are separated in a liquid/solids separation step, with the solids being subjected to calcination to recover gold and the liquid recycled to the gold stripping step.

The raffinate from the gold extraction step may be treated for recovery of iron. For instance, the raffinate may be subjected to solvent extraction with a dialkyl ketone. In particular, the alkyl groups of the dialkyl ketone may be $C_1$-$C_6$ alkyl groups, especially $C_1$-$C_4$ alkyl groups, examples of which are methyl, ethyl, propyl and butyl including isopropyl and isobutyl. Preferred ketones are methylisobutylketone (MIBK) and diisobutylketone (DIBK). The dialkyl ketone is preferably mixed with a diluent and a modifier. Examples of the diluent are organic phase diluents, for instance kerosenes e.g. CF-231 kerosene. Examples of the modifier are alcohol surfactants e.g. EXXAL™ 13 tridecylalcohol. In an embodiment, methylisobutyl ketone is used in a ratio of May 10, 1985 of MIBK/EXXAL™ 13 tridecyl alcohol/CF-231 kerosene. Iron is stripped from the loaded organic solution obtained e.g. by addition of water, and may be recovered by pyrohydrolysis to give $Fe_2O_3$ which may be offered for sale. The raffinate from iron pyrohydrolysis contains hydrochloric acid which may be recycled to the leaching step. The raffinate from the gold extraction step contains hydrochloric acid and magnesium chloride which, subsequent to iron extraction, may be recycled to the leaching step. Methods for purification and recycling of such liquids are known.

In an embodiment of the invention, the gold ore or concentrate contains other value metals. It may be advantageous to subject the gold ore or concentrate to a first extraction step using a lixiviant of hydrochloric acid and magnesium chloride at a lower temperature e.g. a temperature in the range of 65-80° C., especially 70-75° C., followed by a liquid/solids separation step. The liquid may be subjected to steps to recover value metals therein. The solids may be subjected to the steps described herein for the recovery of gold.

A particular advantage of the process of the present invention, and its embodiments, is that high rates of extraction of gold are obtained in a leaching step that operates at atmospheric pressure. The use of sodium thiosulphate in the stripping of gold allows for recovery of gold from the organic solution in a simple and effective manner. The use of atmospheric pressure results in substantial economic advantages, especially in capital costs. The use of chloride chemistry offers advantages in operating and capital costs of the process. Leaching agent may be regenerated and recycled, especially using a pyrohydrolysis step with additional hydrochloric acid being formed from chlorine if required. Magnesium chloride may be recycled to the leaching step.

The present invention is illustrated by the following Examples.

Example I

A concentrate of a gold-bearing ore was subjected to a leach using a lixiviant of hydrochloric acid, magnesium chloride and an oxidant. The concentrate contained 5.34 mg/L of Au and 6.7 g/L of Fe. The lixiviant contained 32 g/L of magnesium chloride and the hydrochloric acid was 1N. The resulting leach solution was subjected to a liquid/solids separation step, and the liquid was subjected to extraction with LIX 622N, which is 5-nonylsalicylaldoxime, in EXXAL™ 13 tridecyl alcohol and CF-231 kerosene with the oxime being 56.5±2.3% (w/w). The ratio of organic:aqueous in the extraction solution was 1:1, the temperature was room temperature and the time of contact between the extractant and liquid from the leach was 3 minutes.

The results were as follows:

| Metal | Feed (mg/L) | Raffinate (mg/L) | Extraction (%) |
|---|---|---|---|
| Au | 5.34 | 2.27 | 57.5 |
| Fe | 6700 | 6700 | 0 |

The results show very effective separation of gold from iron in the leach solution, in a one-step extraction. Repetition of the extraction step lowered the amount of gold in the raffinate.

Example II

Solution obtained from Example I was subjected to stripping with 0.1M sodium thiosulphate ($Na_2S_2O_3$) solution. The results obtained were as follows:

| Organic Phase Au (mg/L) | Stripping Solution Au (mg/L) | Stripping Efficiency (%) |
|---|---|---|
| 3.07 | 2.65 | 86.3 |

The results show good stripping of gold from solution obtained in the extraction of gold from the leach solution.

Example III

Samples of a gold-bearing ore, in the form of a concentrate, were subjected to a two-stage leach at atmospheric pressure with a lixiviant of hydrochloric acid (4N) containing magnesium chloride at a concentration of 250 g/L. The Eh was 1150 mV. In the first stage of the leach, the temperature was 70° C. and in the second stage the temperature was 90° C. In each of the first and second stages of the leach, the leaching time was 2 hours.

Two separate runs of the leach were made, each using 50 g of a gold-bearing ore that assayed 3.48 ppm of gold. In each of the two runs, the solids obtained after a liquid/solids separation step weighed 17 g; the assay of gold in the solids was 0.20 and 0.19 ppm, respectively. Thus the extraction of gold from the gold-bearing ore in the two runs was 98.12% and 98.05%, respectively.

Example IV

A concentrate of a roaster calcine-magnetic concentrate obtained from a gold-bearing ore was subjected to a leach using a lixiviant of hydrochloric acid and magnesium chloride followed by a liquid/solids separation step. The liquid obtained contained 45.7 mg/L of gold and 22300 mg/L of iron. The liquid was subjected to extraction with LIX 622N, which is 5-nonylsalicylaldoxime, in EXXAL™ 13 tridecyl alcohol and CF-231 kerosene, with the ratio being Jan. 20, 1979. The ratio of organic:aqueous in the extraction solution was 1:1, the temperature was room temperature and the time of contact between the extractant and liquid from the leach was 3 minutes. The feed and raffinate solutions were analyzed for gold and iron. The results obtained are shown in Table 1:

TABLE 1

| Metal | Feed (mg/L) | Raffinate (mg/L) | Extraction (%) |
|---|---|---|---|
| Au | 45.7 | 19.2 | 58.2 |
| Fe | 22300 | 22300 | 0 |

The pregnant solvent was then subjected to stripping with 0.1M sodium thiosulphate using a ratio of organic:aqueous of 1:1. The results obtained were as follows:

TABLE 2

| Organic phase (Au mg/L) | Stripping Soln (Au mg/L) | Stripping Efficiency (%) |
|---|---|---|
| 26.6 | 22.5 | 84.6 |

The results show that sodium thiosulphate is effective in stripping gold from the pregnant solvent solution.

Example V

Samples of a gold-bearing concentrate were subjected to a leach using a lixiviant of hydrochloric acid (4N) and magnesium chloride (250 g/L). The Eh of the lixiviant was adjusted to 1150 mV. The leach was conducted in two stages, firstly at a temperature of 70-75° C. and then at 90-95° C., with a liquid/solids step between stages. The time of leaching in each stage was 2 hours. After a liquid/solids separation step, gold was recovered from the liquid using the method of Example IV. The first sample subjected to the leach was a calcined sample of a gold ore and the second sample was a concentrate of a gold ore.

Analysis subsequent to the second leach showed that 99% of the gold was extracted from the calcined sample and 98% of the gold was extracted from the concentrate sample.

Example VI

To illustrate an alternate extraction step, liquid obtained from a liquid/solids separation step as described in Example IV was subjected to extraction with Alamine™ 336 alkyl amine in EXXAL™-13 tridecyl alcohol and CF-231 kerosene, with the ratio being 35/20/45. The ratio of organic:aqueous in the extraction solution was 1:1, the temperature was room temperature and the time of contact between the extractant and liquid from the leach was 10 minutes. The feed and raffinate solutions were analyzed for gold and iron. The results obtained are shown in Table 3.

TABLE 3

| Metal | Feed (mg/L) | Raffinate (mg/L) | Extraction (%) |
|---|---|---|---|
| Au | 99.9 | 0.08 | 99.9 |
| Fe | 14800 | 1.35 | 99.9 |

Example VII

A first sample of the loaded organic solution obtained in Example VI was subjected to selective stripping, in two stages, using 0.05N HCl at an organic:aqueous ration of 1:1 at room temperature for 10 minutes in each stage. A second sample was stripped with 2% thiourea solution at an organic:aqueous ratio of 0.33 at room temperature for 5 minutes.

The results obtained were as follows:

| | Organic Phase | | Stripping (%) | |
|---|---|---|---|---|
| Stripping Method | Au (mg/L) | Fe (mg/L) | Au (mg/L) | Fe (mg/L) |
| HCl | 99.82 | 14800 | 0.0 | 87.8 |
| Thiourea | 99.82 | 1819 | 95.27 | 3.5 |

The results showed that hydrochloric acid stripped iron from the loaded organic solution whereas thiourea stripped gold from solution, thereby illustrating preferential stripping of iron or gold from the loaded organic solution.

What we claim is:

1. A process for the extraction of gold from a gold-bearing ore or concentrate, consisting the steps of:
    a) leaching the gold-bearing ore or concentrate with a lixiviant of hydrochloric acid and magnesium chloride at atmospheric pressure at a temperature of at least 90° C. and an Eh of at least 900 mV;
    b) subjecting the solution obtained in step a) to a liquid/solids separation step;
    c) subjecting the liquid obtained in step b) to an organic solvent extraction step to selectively extract gold from the liquid and obtain a pregnant gold-bearing organic solvent extractant solution;
    d) stripping gold from the pregnant organic solvent extractant solution obtained in step c) with sodium thiosulphate; and
    e) recovering gold;
    in which the organic solvent extraction of step c) is carried out using an oxime.

2. The process of claim 1 in which the solvent extraction of step c) is a selective extraction step to obtain gold.

3. The process of claim 1 in which the solvent extraction of step c) is a co-extraction step to obtain gold and another metal.

4. The process of claim 1 in which, in step d), gold is recovered by precipitation.

5. The process of claim 1 in which the oxime is 5-nonylsalicylaldoxime.

6. The process of claim 1 in which, subsequent to the stripping of step d), gold is precipitated from solution by addition of oxalic acid.

7. The process of claim 6 in which, subsequent to the precipitation of gold, the solution obtained is subjected to a liquid/solids separation step and the liquid obtained is recycled to step a).

8. The process of claim 1 in which the raffinate from step c) is subjected to steps to remove iron, and magnesium chloride solution so obtained is recycled to step a).

9. The process of claim 1 wherein the gold-bearing ore or concentrate is in the form of tailings from another process or a roasted or calcined ore or concentrate.

* * * * *